May 7, 1935. O. F. CARLSON Re. 19,558

BOILER FEED CONTROL

Original Filed Feb. 5, 1931 4 Sheets-Sheet 1

Witnesses:
Harry R. White
Robert Cremer

Inventor:
Oscar F. Carlson
By Macpherson Boutelle & Dunner
Attys

May 7, 1935. O. F. CARLSON Re. 19,558

BOILER FEED CONTROL

Original Filed Feb. 5, 1931 4 Sheets-Sheet 2

Witnesses:
Harry R. L. White
Robert Cremer

Inventor
Oscar F. Carlson
By Brown Jackson & Boettcher
Attys

May 7, 1935. O. F. CARLSON Re. 19,558

BOILER FEED CONTROL

Original Filed Feb. 5, 1931 4 Sheets-Sheet 3

Witnesses:
Harry R. L. White
Robert Cremer

Inventor:
Oscar F. Carlson
By Brown Jackson Boettcher & Dienner Attys

May 7, 1935. O. F. CARLSON Re. 19,558

BOILER FEED CONTROL

Original Filed Feb. 5, 1931 4 Sheets-Sheet 4

Witnesses:
Harry R. L. White

Inventor
Oscar F. Carlson
By Macfarlane, Anderson, Dennis
Attys

Reissued May 7, 1935 Re. 19,558

UNITED STATES PATENT OFFICE 19,558

BOILER FEED CONTROL

Oscar F. Carlson, Chicago, Ill., assignor of one-half to Oscar F. Carlson Company, Chicago, Ill., a corporation of Illinois, and one-half to Everett N. McDonnell, Chicago, Ill.

Original No. 1,934,486, dated November 7, 1933, Serial No. 513,485, February 5, 1931. Application for reissue May 9, 1934, Serial No. 724,769

39 Claims. (Cl. 137—101)

The present invention relates generally to valves and more particularly to float controlled valves by which the height of liquids in vessels may be automatically regulated.

Such devices have been commonly known as feed water regulators, liquid level regulators and the like, and are commonly employed on low pressure boilers, such as those frequently used in steam and hot water heating plants, feed-water heaters for steam engine boilers, and other similar installations.

Generally speaking, devices of this kind usually comprise a valve interposed in the feed line leading from the source of supply to the boiler and a float or other liquid level responsive means movably mounted in a float housing which is in communication with the boiler in such a manner that the level of the water in the boiler and in the float housing is the same. Operative connections between the movable float and the valve in the feed line of various kinds are provided. Heretofore it has usually been necessary to position these connections directly in the float housing on account of the difficulty in securing a liquid tight packing between the float arm and the float housing. In addition, considerable difficulty has also been encountered in providing a liquid tight connection between the feed control valve and the operating connections therefor between the valve and the float.

One object of my invention, therefore, is the provision of improved packing or sealing means for the feed control valve and for the movable float in the float chamber so that all danger of leakage is obviated. Another object of my invention is to so construct and arrange the operating connections between the float and the valve that they are not exposed to the liquid either in the boiler or in the feed line so that there is little danger of these parts becoming rusty and inoperative or otherwise disabled. This is quite important in that if any of the parts stick or fail to operate there is great danger that the water in the boiler may become too low with consequent injury to the boiler and considerable likelihood of expensive repairs.

In recent years it has become quite common to fire boilers using electrically driven oil burners and it is in such installations that my invention finds its greatest utility. Oil burners produce a hot flame and when starting up a boiler it sometimes occurs that the rapid heating of the boiler causes foaming or excessive agitation of the water so that there is no definite liquid level therein. In this case there is a danger that portions of the boiler may become exposed with consequent warping and burning. In order to remedy this condition I propose to provide my feed water regulator with means which may be used to open the electric circuit so as to thereby shut off the oil burner.

Other objects and advantages of my invention will be apparent to those skilled in the art after a consideration of the following detailed discussion of one preferred embodiment of the same taken in conjunction with the accompanying drawings in which.

Figure 2:
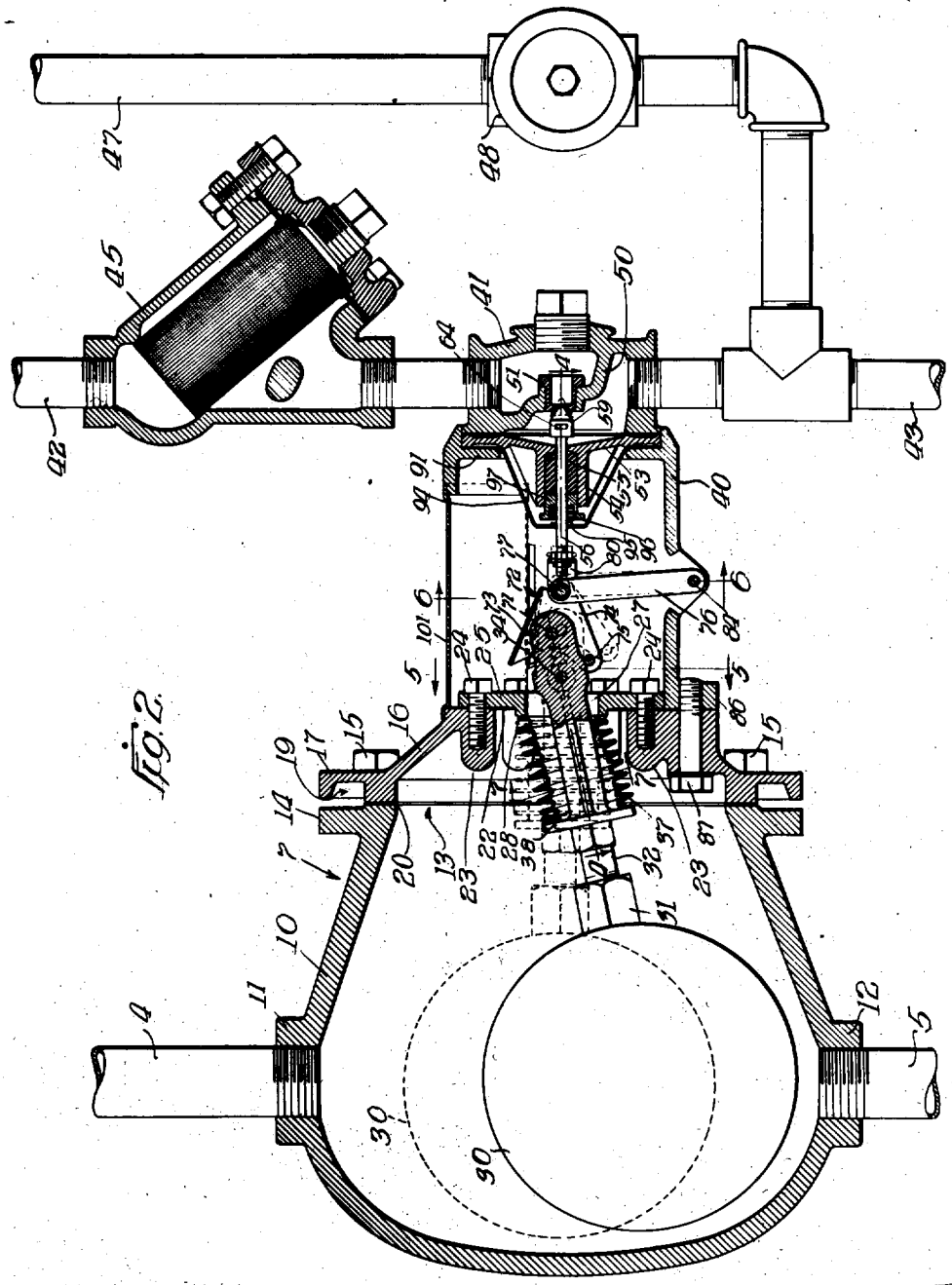
Figure 2 is an enlarged vertical section substantially midway of my improved regulator and showing in full lines the position of the parts when the valve in the feed line is open and water is being passed to the boiler to raise the liquid level therein.
Figure 4:
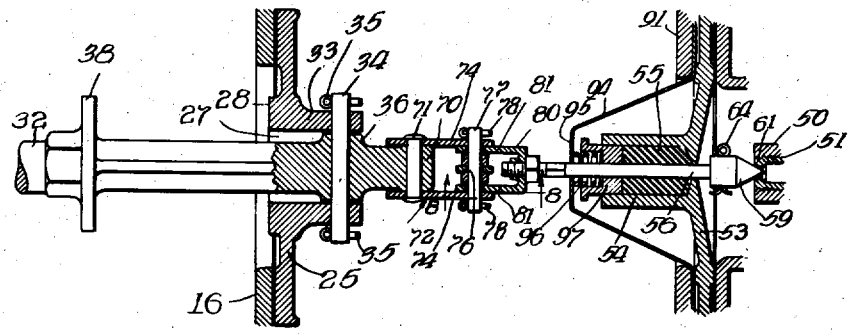
Figure 4 is an enlarged view taken substantially along the line 4—4 of Figure 2.
Figure 5:
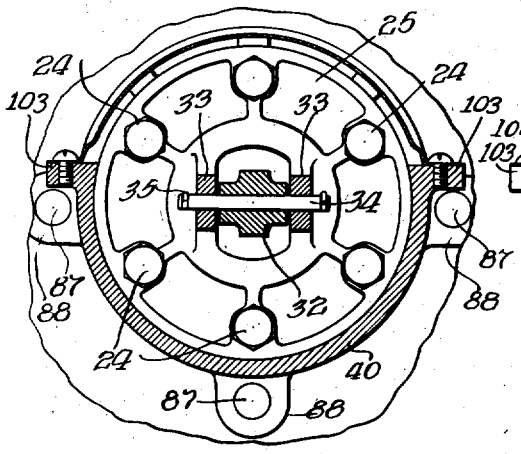
Figure 6:
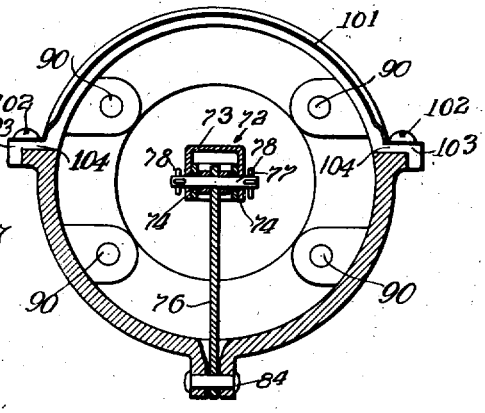
Figure 7:
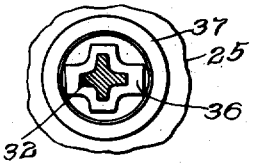
Figure 9:
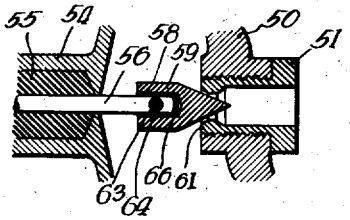
Figure 8:
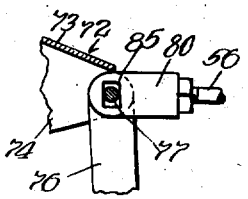
Figure 10:
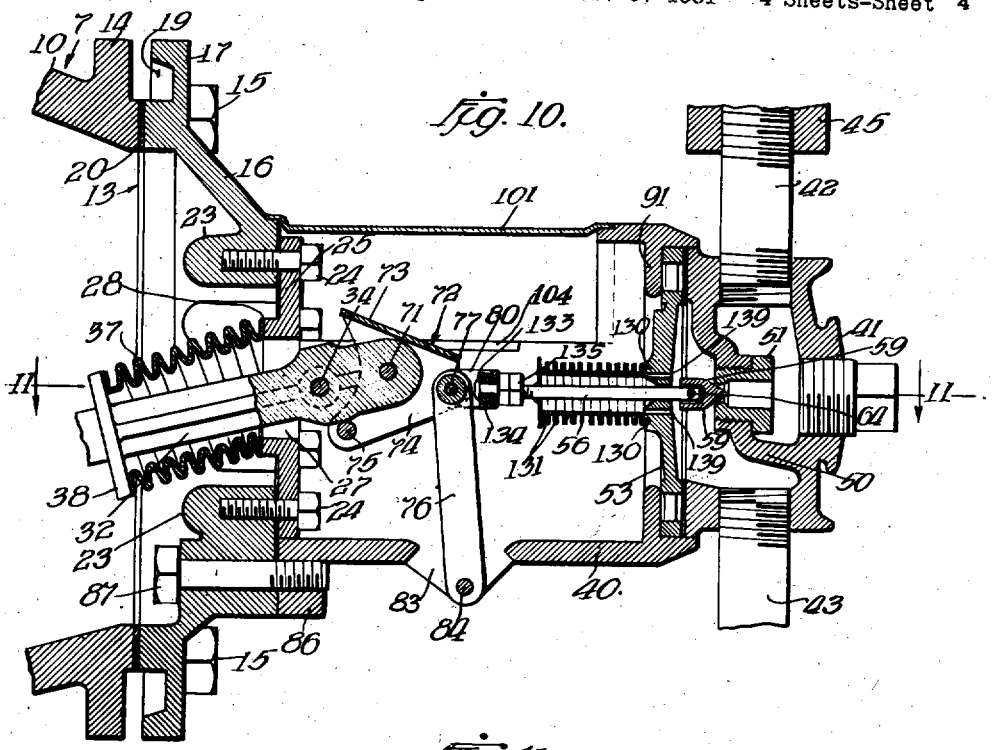
Figure 11:
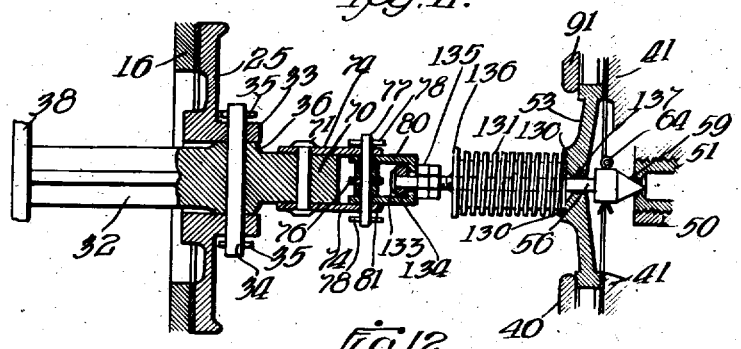
Figure 12:
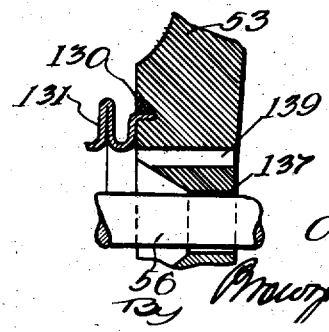

Figures 5 and 6 are cross sectional views taken along the lines 5—5 and 6—6, respectively, of Figure 2 and looking in the direction of the arrows;

Figure 7 is an enlarged detail showing a portion of the sealing bellows in section and a part in elevation and taken along the line 7—7 of Figure 2;

Figure 8 is an enlarged fragmentary section taken along the line 8—8 of Figure 4;

Figure 9 is an enlarged section showing the mounting of the self centering valve closure for the feed line;

Figure 10 is an enlarged cross section through a slightly modified form of the present invention, showing another form of packing or sealing means for the feed control valve, particularly adapted to secure a quick operation of the valve and an effective seal or packing therefor;

Figure 11 is a fragmentary cross sectional view taken substantially along the line 11—11 of Figure 10; and Figure 12 is an enlarged fragmentary sectional view showing the mounting of the bellows sealing means on the supporting plate of the feed control valve.

Figure 1:
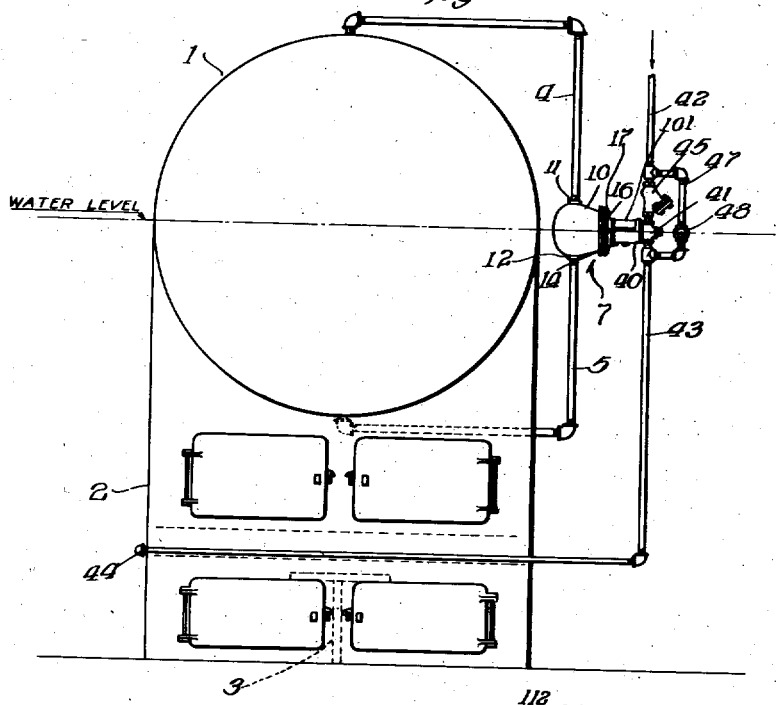
Figure 1 is an elevational view showing the boiler with my improved regulator mounted thereon.

Referring now to the drawings, the reference numeral 1 indicates a boiler, the type of vessel or container which I have chosen to illustrate one application of the use of my invention. Underneath the boiler 1 is the furnace 2 which may be fired by means of an oil burner 3 as is well known in the art. Conduits or pipe lines 4 and 5 lead respectively from the top and bottom of the boiler 1 and are connected at their adjacent ends to my improved feed water regulator, indicated in its entirety by the reference numeral 7. As best shown in Figure 1, my improved regulator is disposed so as to lie substantially in a horizontal median plane which corresponds to the normal water line it is desired to maintain in the boiler. It is to be understood, of course, that this normal water line may vary in various types of boilers and that in different installations the regulator 7 may occupy relatively different positions with respect to the boiler than the one shown in Figure 1.

Figure 3:
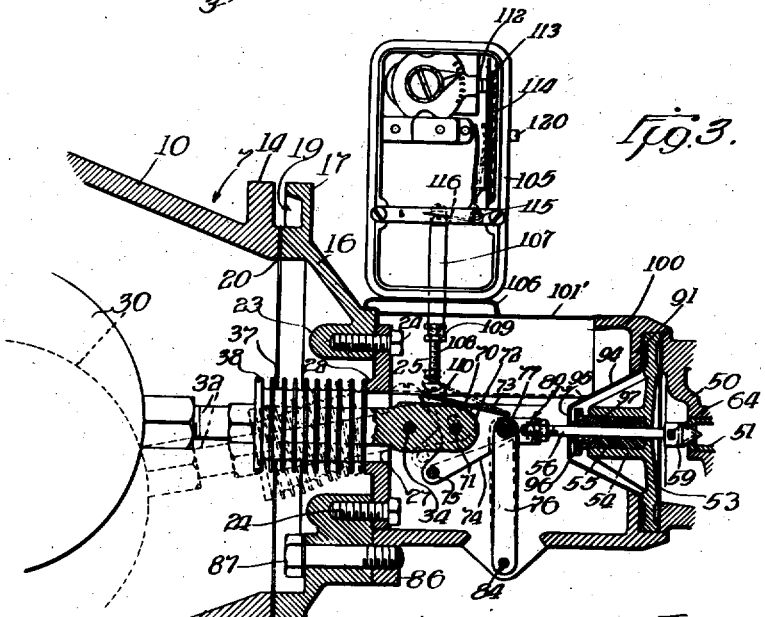
Figure 3 is a cross sectional view corresponding to the view shown in Figure 2 but showing the parts as they appear when the liquid level in the boiler is at the proper height and the float and associated parts holding the feed valve closed. This view also shows an electric circuit controlling switch which is adapted to be operated when the float falls to low water position.

The pipes 4 and 5 are connected to the regulator 7 so as to substantially support the same and these pipes 4 and 5 are in communication, respectively, with the top and bottom of the float housing or chamber 10 of the regulator 7, as best shown in Figure 2. The float housing 10 may be provided with threaded bosses 11 and 12 to receive the pipes 4 and 5, respectively. The float housing 10 is provided with a flanged opening 13 having the usual bolting flange 14 to which is secured, as by bolts 15, a cap or closure 16. The closure 16 is also provided with a bolting flange 17 which, for purposes of rigidity may be channeled as indicated by the reference numeral 19. A gasket 20 is secured between the closure 16 and the float housing 10 so as to effect a liquid tight seal between these parts. From Figures 2 and 3 it will be noted that the closure 16 is conically formed and is provided with an opening 22 of a diameter considerably smaller than the opening 13. Adjacent the opening 22 the closure 13 is provided with a number of projections or bosses 23 which are threaded to receive cap screws 24 by which a closure plate 25 is secured to the closure 16. The plate 25 is provided with an opening 27 having a shoulder or flange 28 extending therearound, as best shown in Figure 3.

Mounted for up and down swinging in the float housing 10 is a float 30, preferably formed in the shape of a sphere of seamless copper or other desired or convenient material, and welded or otherwise secured to the float 30 is a nut member 31 by which the float 30 is threaded onto and secured to a float arm 32. The closure plate 25 is provided with a pair of apertured ears 33, see Figure 4, upon which is supported the pivot pin 34. Cotter keys 35 may be employed to retain the pivot pin 34 in proper position in the ears 33. The float arm 32 is provided with an apertured boss 36 to receive the pivot pin 34 whereby the float arm 32 is pivotally supported upon the plate 25 which, by means of the closure 16, is supported upon the float housing 10.

Since the float housing 10 is in communication with the boiler 1 it is necessary to prevent water and steam from passing out of the opening 22. It is also necessary, however, that the float arm be free to rise and fall with the changing level of water in the boiler and in the float housing 10. I have found that the most effective seal or packing which does not restrain the float from swinging up and down but which, at the same time, effectively prevents the leakage of water and steam is one which takes the form of a flexible metal bellows, such as the one indicated in Figures 2 and 3. This bellows or metallic packing is indicated by the reference numeral 37 and is corrugated to provide for resilient flexing of the same. One end of the bellows 37 is secured and sealed, as by soldering, brazing, and the like, to the flange 38 formed on the float arm 32 adjacent the pivot or fulcrum of the same, best shown in Figure 4. The other end of the bellows 37 is soldered or brazed to the flange 28 on the closure plate 25 and surrounding the opening 27. The bellows 37, being freely flexible, offers substantially no resistance to the oscillations of the float arm 32 and yet, being sealed at one end to the closure plate 25 and at the other end to the float arm 32, prevents all leakage from the float chamber 10 at this point.

Returning now to Figure 1, it will be observed that an intermediate housing 40 is secured to the closure 16 at one end and to the other end of the intermediate housing 40 is secured a valve housing 41. Leading into the valve housing 41 is a feed pipe 42, and leading out of the valve housing 41 is a pipe 43, actually forming an extension of the feed pipe 42, the pipe 43 leading into the boiler in any known manner, as indicated by the reference numeral 44 in Figure 1. If desired, a strainer 45 may be interposed between the pipe line 42 and the valve housing 41. A by-pass including a manually operated valve 48 may be installed so that when desired feed water may be directed into the boiler regardless of the position of the parts in the regulator 7. The by-pass 47 is preferably connected to pipes 42 and 43 by the usual elbows and T's, as is well known in the art.

The valve housing 41 includes a partition 50 having a threaded aperture therein which receives a valve seat member 51, best shown in Figure 9. A plate 53 completes the valve housing 41, and from Figure 2 it will be noted that the plate 53 is provided with a cylindrical boss 54 having an enlarged chamber to receive packing 55 which surrounds and seals the valve stem 56 passing through the plate 53. One end of the stem 56 is received within an opening or recess 58 formed in a valve closure member 59, best shown in Figure 9. One end of the valve closure 59 is tapered to conical form and the pointed end of the valve closure 59 is received into the valve seat 51.

Preferably the valve closure 59 is formed of hardened stainless steel so as not to corrode and the valve seat member 51 is preferably formed of soft stainless steel. The seat proper 61 of the valve member 51 may be formed by swaging so as to present a surface corresponding exactly to the tapered or conical surface of the valve closure 59.

In order that the valve closure 59 may properly seat each time the valve is operated I contemplate loosely mounting the valve closure 59 on the stem 56 so that the closure 59 becomes substantially self-centering. As stated above, the valve stem 56 is received within a recess or opening 58 in the valve closure 59. This end of the stem 56 is provided with a relatively large opening 63 to loosely receive a pin or cotter key 64 passed through openings in the valve closure 59. As shown in Figure 9, the opening or recess 58 is substantially larger than the stem 56, and received in the bottom of the opening 58 is a disc 66 against which the end of the stem 56 bears.

The purpose of the disc 66 is, in the first place, to obviate the necessity of forming the bottom of the recess 58 exactly in correspondence with the end of the stem 56 and, in the second place, the inherent resiliency of the disc 66 may be relied upon to yieldingly hold the valve closure 59 on the seat 61 when the flow of feed water through the valve housing 41 is stopped.

I shall now describe the connections between the valve stem 56 and the float arm 32 whereby, when the float rises and falls in the float housing 10 the valve closure 59 will be caused to open and close the valve 41 in the feed water supply line. The end of the float arm 32 extending beyond the pivot 34 is indicated by the reference numeral 70 and this end is pivoted by means of a pivot pin 71 to a swinging link member 72 preferably of U-shaped or channel formation having an upper surface 73 and depending side portions 74, see Figure 6. The pivot pin 71 passes through openings in the side portions 74 and is preferably maintained in position therein by being riveted to the side portions as best shown in Figure 4.

The swinging link member 72 is pivoted upon a swinging fulcrum or link 76 by means of a pivot pin 77 passing through the side portions 74 and maintained in position therein by means of cotter keys 78. Referring more particularly to Figure 2, it will be seen that when the float 30 rises from its full line position to the position indicated in dotted lines the float arm 32 will be swung in a counterclockwise direction about the pivot 34 which in turn will swing the member 72 in a clockwise direction about the pivot 77, the swinging fulcrum or link 76 swinging the pivot pin 77 forward so that the pins 34, 71 and 77 take a position substantially in a straight line as shown in Figure 3, which shows the float 30 in its upper position in full lines.

This back and forth movement of the pivot pin 77 occasioned by the rise and fall of the float 30 is utilized to open and close the valve in the valve housing 41. The end of the valve stem 56 opposite the valve closure 59 is threaded to adjustably receive a yoke member 80 having apertured ears 81 embracing the pivot pin 77, as best shown in Figure 4. From this figure it will also be observed that the yoke 80 is rigidly secured to the stem 56, and that the packing 55 restrains the latter in its movement to substantially a horizontal linear displacement. The swinging fulcrum or link 76 is pivoted to the intermediate housing 40 in a slot 83 in the lower portion thereof by means of a pivot pin 84 about which the link 76 and the pin 77 swing. Since the pin 77 swings about an arc and the yoke 80 is restrained to move in a linear direction the apertures 85 are formed in the shape of vertically extending slots so as to accommodate the component of vertical movement experienced by the pin 77 when the swinging fulcrum 76 pivots back and forth, the apertures or slots 85 being no wider than the diameter of the pin 77 the stem 56 moves in the slot in response to the slightest displacement of the float 30. The side portions 74 of the swinging link member 72 are connected by a stop pin 75 which, when the float is in the lower position, contacts with the lower side of the float arm 32 to limit the downward movement of the float 30, as shown in full lines in Figure 2.

The intermediate housing 40 is preferably secured to the closure 16 by means of stud bolts 87 passing through openings in the closure 16 and threaded into the flange 88 formed on the housing 40. The valve housing 41 is clamped to the other end of the housing 40 by means of set screws 90 threaded through the housing 41 and into the inwardly extending radial flange 91 formed on the other end of the intermediate housing 40. As best shown in Figures 2 and 3 the plate 53 is clamped between the housing 41 and the flange 91, there being a gasket of any suitable material interposed between the housing 41 and the plate 53 to seal these parts in leak tight relation. Clamped between the plate 53 and the flange 91 is a packing abutment 94 preferably formed of sheet metal and having a tapered extension surrounding the cylindrical boss 54 and provided with an aperture embracing the valve stem 56. The apertured extension is formed, as at 95, to provide an abutment shoulder against which the spring 96 bears. The other end of the spring 96 is received within a recess formed on the packing follower 97. The relation of the parts are such that the spring 96 is under considerable tension so as to thereby serve as means for compressing the packing 55 to maintain the same tight relation against the stem 56 to prevent leakage of water from the valve housing 41 along the stem 56 and into the intermediate housing 40.

From the structure so far described the operation of my improved feed water regulator is believed to be apparent. The float 30 rises and falls with variations of liquid level in the float housing 10, which liquid level by virtue of the connections 4 and 5 is the same as or proportioned to the liquid level in the boiler 1. The float arm 32 will thereby be caused to swing up and down which will, through the connections 72, 76 and 80, occasion the displacement of the valve stem 56 one way or the other, according to whether the float rises or falls. If the float 30 falls the valve closure 59 will be drawn away from the seat 61 thereby establishing communication between the feed line 42 and the boiler 1 through the pipe line 43. Thus water from a source of supply connected to the feed pipe 42 will be directed into the boiler 1 and will raise the water level therein until the float rises sufficient to move the valve stem 56 to the right in Figures 2 and 3 to thereby cause the valve closure to seat against the member 61 thereby cutting off communication between the boiler and the source of supply and shutting off the ingress of water. In low pressure boilers and similar installations, the feed line 42 may be connected directly to the city mains, and this is also true in case the regulator 7 is applied to feed water heaters which do not operate under pressure. It is to be understood, however, that my improved regulator is just as applicable to pressure boilers, all that is necessary is that the source of supply be under a pressure sufficient to cause the water to flow into the boiler.

It will be observed that by virtue of the sealed bellows 37 and the packing means 55—94 the intermediate housing is not subjected to either the pressure or liquid in the boiler or the pressure or liquid in the feed line 42—43. Preferably the intermediate housing 40 is open to atmospheric pressure and has its upper part cut away to provide a relatively large opening 100, see Figure 3, which may be closed by a closure plate 101 secured to the housing by means of screws 102. Threaded bosses 103 may be provided to receive the screws 102 and these bosses 103 serve as spacing means for spacing the closure plate 101 above the lateral edges of the opening 100, as best shown in Figures 6 and 10. This construction provides for the circulation of air through the intermediate housing so as to prevent any material heat transmission between the float housing 10 and the valve housing 41. Air can enter the intermediate housing through the lower slot 83 in which the link 76 is pivoted and can escape through the spaces 104 underneath the marginal portions of the removable plate 101, see Figures 6 and 10. The movement of the air through the intermediate housing is thus directed into thermal relation with respect to the connections therein.

The effect of heat upon raw water bearing lime or magnesia is well known in forming precipitates. A hot metal part in contact with raw water containing such solids causes precipitation upon itself of such solids. This is a serious matter, particularly for closely fitting parts such as pivots, sliding joints or connections, or rotary parts or connections. When the degree of motion is small and the power available low, as in float operated devices, the deposit of scale or lime is fatal to continuous automatic operation. The float housing of a feeder of this type must communicate with the steam space. Hence, any part in contact with the steam will be subject to large heat transmission because of the ability of condensing steam to give up much heat. A part in contact with water cannot give up heat at the same rate because the heat travel through relatively still water is slow, water being a fairly good heat insulator.

Now it will be observed that the mechanical frame connection between the float housing 10 and the valve housing 41 is below the water level maintained in the float housing 10, (see the water line in Figure 1), to retard the transmission of heat from the steam to the cold valve housing 41 as much as possible. This connection is also of relatively thin section and large superficial area whereby the heat is chiefly dissipated to atmosphere before it can reach the valve housing 41.

The operating connections between the float arm 32 and the valve stem 56 do not permit the transmission of any appreciable heat for several reasons; first, the float arm is at all times substantially below water level, (see Figs. 1 and 3); next, the connection is broken up by an interposed linkage which has large radiating area and relatively thin section—see particularly links 72 and 80. In addition, the housing 40 is arranged to permit circulation of air therethrough to carry off heat from said connections. By the above arrangement the feed valve 41 is isolated from the heat of the float chamber and particularly the steam therein, with the result that long continued, reliable automatic operation is secured.

In connection with the intermediate housing another feature of importance is to be noted. The closure plate 101 may be easily removed for the purpose of inspecting and oiling the parts and connections in the intermediate housing 40 without affecting in any way the continuous operation of the feed water control, and this removable closure plate 101 also serves the important function of allowing circuit controlling means to be mounted thereon when and if desirable.

Figure 3 shows one form of a switch for controlling an electric circuit. This switch, indicated in its entirety by the reference numeral 105 may be mounted by means of a base portion 106 directly on a closure plate 101′ exactly the same as the closure plate 101 shown in Figure 6 except that this closure plate 101′ is provided with the switch 105 as described. The particular switch mechanism shown in Figure 3 includes a downwardly extending switch actuating rod or projection 107, preferably of insulating material, the lower end of which is provided with a bolt 108 threaded into the insulating rod 107 and fixedly secured thereto in adjusted position by means of a lock nut 109. The end of the bolt 108 is adapted to be contacted by a portion of the swinging link member 72, this portion being indicated by the reference numeral 110 in Figure 3. To accommodate this arrangement the member 72, or at least the portion 110 thereof, is disposed adjacent the removable closure plate, whereby the actuation of the switch or other mechanism is greatly facilitated. In Figure 3 the float 30 is shown in its upper position in full lines and when in this position the abutment portion 110 does not contact with the switch operating bolt 108. When, however, the float 30 falls to its lowermost position, that shown in dotted lines in Figure 3, the abutment 110 contacts the bolt 108 and lifts the same upwardly to open the switch 105. It is to be understood however, that when the switch mechanism 105 is employed the bolt 108 is so adjusted that normal variations in the level of water in the float housing 10, causing minor oscillations of the float 30, will not cause the swinging link member 72 to contact with the bolt 108. Under abnormal conditions, as when the boiler is foaming or when the water is being evaporated faster than feed water can flow in through the feed line 42—43, the float 30 will fall to its lowermost position and in doing so will throw the switch 105.

It is to be noted that the extended portion 110 of link 72 has greater amplitude of motion than the toggle joint 71. This is a desirable feature for operating the switch 105 because a definite, fairly large motion is required to be made to open the switch, and must occur at the end of the downward travel of the float 30. Any equivalent method of insuring a fairly wide amplitude of motion for this purpose may be provided.

The switch 105 may be of any desired commercial or well known form and my invention is not concerned with the particular type of switch mechanism employed. I have chosen, however, to illustrate my invention in conjunction with the switch mechanism 105 which includes a pair of contacts 112 and 113, the contact 112 being relatively fixed while the contact 113 is mounted upon an arm 114 which forms one leg of a lever or bell crank pivoted at 115 to the switch casing and having a second arm 116 to which the rod member 107 is secured. In this particular type of switch the contacts 112 and 113 are manually set, as by a button 120, to establish or close an electric circuit, and when the water falls too low in the boiler the float 30 will fall, whereupon the rod 107 will be raised, thereby opening the circuit by separating the contacts 112 and 113.

The switch mechanism 105 may be employed to actuate any desired type of alarm, as may be desired, but, preferably, I propose to associate the same with the oil burner 3 so that when the boiler 1 is operating under abnormal conditions, such as those named above, the float 30 will operate to open the circuit through the switch mechanism 105 and thereby shut off the oil burner 3 to prevent overheating or injuring the boiler 1.

An important part of my invention is included in the feature of the removable plate 101. By means of such structure my improved regulator is just as easily adapted for installations where the boiler is fired by means other than an oil burner, such as indicated by the reference numeral 3 in Figure 1.

When and if a boiler provided with my improved regulator is changed from one type of burner or heating means to another all that is necessary to do is to remove the plate 101 and install the switch mechanism 105, in case the new installation includes an electrically driven oil burner, or in case it is desired, for any reason whatsoever, to dispense with the oil burner type of heater all that is necessary to do is to remove the switch mechanism together with the plate 101' and substitute therefor the plate 101, a mere matter of a few minutes' work. In removing or installing the switch mechanism 105 no change whatsoever is necessary in the operating connections between the float 30 and the feed water valve 41, nor is it necessary to temporarily shut off the communication of the float housing 10 with the boiler 1 or the communication of the valve 41 with either the conduit leading to the source of supply or the conduit leading to the boiler itself.

When operating without the switch mechanism 105 and its feature of automatic burner control and it is discovered that the water in the boiler is not being replenished at the proper rate all that is necessary to do is to open the valve 48 for a short period of time permitting water to flow into the boiler directly from the feed line 42 and by-passing the valve 41.

In Figures 10, 11 and 12 I have shown a modified form of packing or sealing means for the float controlled feed valve 59. In this particular modification the important advantage is realized of having an absolutely leak tight packing, at the same time realizing other advantages which will be apparent from the following description. The plate 53 is not provided with a cylindrical boss as the one shown at 54 in Figure 2 but has an annular groove 130 in which is received a flexible bellows or metallic packing 131 similar to but smaller than the bellows 37 associated with the float arm 32. Preferably, the bellows 131 is seated in the groove 130 and then secured therein in leak tight relation by filling the groove with solder or the like, as best shown in Figure 12.

The valve stem 56 in this modification is quite similar to the valve stem shown in Figure 2 and, like the one there shown, has one end threaded. In this modification, however, the yoke 80 is not rigidly secured to the valve stem 56 but is loosely mounted thereon. To secure this type of mounting the threaded end of the valve stem 56 is formed with a flange or head 133 turned thereon and which serves as an abutment for a collar 134 against which the yoke 80, loosely mounted on the stem 56, is received. A pair of lock nuts 135 cooperate with the flanged head 133. In this manner the yoke 80 is capable of a limited amount of rocking movement relative to the stem 56 but is prevented from moving axially thereon.

The threaded end of the valve stem 56 receives a cap or end plate 136 to which the other end of the bellows 131 is secured by soldering, and preferably the cap 136 is soldered onto the valve stem 56 so as to assure an absolutely leak-tight joint between the valve stem 56 and the plate 53.

The plate 53 is provided with a central opening 137 slightly larger than the diameter of the valve stem 56 so that the latter has a loose fit therein. A pair of apertures 139 are formed in the plate 53 and spaced so as to provide communication between the interior of the small bellows packing 131 and the outlet side of the valve housing 41. While I have shown only two of such apertures it is to be understood that more or less may be provided, and in fact they may be dispensed with if the opening 137 is made sufficiently large.

The valve closure 59 is loosely mounted onto the forward end of the valve 56 in exactly the same manner disclosed above in connection with Figure 9.

By virtue of the openings 139 and the opening 137 the bellows 131 is subjected, as indicated above, to the pressure in the valve housing 41. An important advantage is realized from this construction in that this pressure is operative to open the valve 59 with a snap action. This will be understood by referring to Figure 10. As the float valve 30 carrying the float arm 32 has fallen due to a lowered water level the points 34, 71 and 77 are no longer in line with one another and hence the pressure within the valve housing 41 acts interiorly of the bellows 131 tending to force the valve stem 56 toward the left in Figure 10. Since the points mentioned are not in line this force is effective to quickly open the valve 59 and move it away from its seat 61.

The reverse operation is also realized, that is, when the boiler is being filled and the float 30 and its float arm 32 is gradually raised the points 34, 71 and 77 approach a straight line, and hence the pressure against the bellows 131 becomes increasingly ineffective to hold the valve 59 open, whereas before the float arm approached a straight line position the pressure against the bellows 131 retarded to a certain extent the movement of the valve 59. Thus at the time that the valve 59 approaches its seat 61 the pressure on the bellows 131 which formerly tended to hold the valve open is no longer effective so that now the seating of the valve 59 is accomplished with a sort of snap action. This operation is somewhat accentuated due to the fact that the pressure against the bellows 131 is greater when the valve 59 is open than it is when it is closed, due to the fact that the pressure in the water supply or feed pipe 42 is somewhat greater than the pressure in the boiler and in the conduit 43.

While the bellows 37 and 131 are not the same size it is to be observed that when the valve 59 is closed the points 34, 71 and 77 are in a straight line and therefore the pressure on one bellows tends to offset the pressure on the other so as to relieve the joints in the valve operating connections of any excessive lateral strain.

The bellows 131 is flexible in all directions and hence the valve stem 56 may partake of a limited amount of swinging and, as pointed out above, the yoke 80 is also capable of a limited amount of swinging or rocking on the valve stem 56. By virtue of this construction the yoke 80 is not required to have an elongated slot such as the one shown in Figure 8 to accommodate the vertical component of movement of the pin 77. Instead, the yoke 80 may be firmly secured to the pin 77 or have a simple journal fit thereon.

While I have described in conjunction with the accompanying drawings the preferred embodiment of my invention, it is to be understood that my invention is not to be limited to the specific means shown and described but that, in fact, widely different means may be employed in the practice of the broader aspects of my invention.

What I claim and desire to secure by Letters Patent is:

1. A float controlled boiler feed regulator comprising, in combination, a float housing having an inlet and an outlet, a closure for the housing, a float arm pivoted to said closure and having a portion extending into the float housing with a float thereon, and a portion extending outside said closure, a second housing secured to the first housing and enclosing the outer end of the float arm, means effecting a liquid tight seal between said first and second housings, a third housing secured to the second housing and provided with fluid flow control means, means operatively connecting the outer end of said float arm and said control means whereby the position of the float governs the operation of said control means, and sealing means between said second and third housings.

2. A boiler feed regulator comprising, in combination, a float housing, connections between the upper and lower parts of said housing and the boiler, a feed line connected with a source of supply and said boiler and including a valve housing, a valve in said valve housing and having a stem extending through the valve housing, an intermediate housing connecting the float housing and the valve housing and open to atmosphere, the liquid level responsive float in the float housing, and connections therefrom to said valve stem including movable parts in the intermediate housing and means mounted on the last mentioned housing and supporting one of said movable parts.

3. A boiler feed regulator comprising, in combination, a float housing, connections between the upper and lower parts of said housing and the boiler, a feed line connected with a source of supply and said boiler and including a valve housing, a valve in said valve housing and having a stem extending through the valve housing, an intermediate housing connecting the float housing and the valve housing and open to atmosphere, a removable cover plate on said intermediate housing, a liquid level responsive float in the float housing, and connections therefrom to said valve stem, said connections including a part pivotally mounted on the intermediate housing.

4. A liquid level control mechanism comprising a float chamber having an opening at one side thereof with an outwardly directed flange, a float therein, a float arm movably supporting the float and extending at one end from the flanged opening of the float chamber, an intermediate housing having a detachable cover plate and being secured to the flange around said opening, a valve housing rigidly connected with the float chamber in spaced relation and including valve parts operable to control a fluid line, and connections between the valve parts and said end of the float arm disposed in said intermediate housing, the detachable cover for the latter being disposed adjacent certain of said connections.

5. A liquid level control mechanism comprising a float chamber, a float therein, a float arm movably supporting the float and extending at one end from the float chamber, an intermediate housing having a detachable cover plate and being removably secured to the float chamber, a valve housing removably secured to the intermediate housing and including valve parts operable to control a fluid line, connections between the valve parts and said end of the float arm, and packing means sealing off the intermediate housing from the valve housing and from the float chamber.

6. A feed water controller for boilers and the like comprising, in combination, a housing in communication with the boiler, liquid level responsive means movably mounted in the housing, a feed water conduit including a valve, said valve including a housing and a stem, an intermediate housing secured to the float housing and to the valve housing, operating connections between the liquid level responsive means and the stem and enclosed by said intermediate housing, packing and a packing follower for the valve stem, an abutment clamped between the valve housing and said intermediate housing, and a spring tensioned between the abutment and said packing follower.

7. A liquid level control mechanism comprising a float chamber, a float therein, a float arm movably supporting the float and extending from the float chamber, an intermediate housing secured to the float housing, a valve secured to said intermediate housing and including a longitudinally movable stem, a yoke secured thereto and provided with vertical slots, a link member pivoted to the float arm and having pivot means received within said slots, and a link swingably supporting said link member on the intermediate housing and connected to said member to swing relatively thereto coaxially with said pivot means.

8. A liquid level control mechanism comprising a float chamber, a float therein, a vertically swinging float arm movably supporting the float and extending from the float chamber, an intermediate housing secured to the float housing, a valve secured to said intermediate housing and including a longitudinally movable stem, a yoke secured thereto and provided with vertical slots, a vertically swinging link member pivotally connected to the float arm and having a pivot pin received within said slots for relative vertical movement, and a horizontally swinging supporting link pivoted to the intermediate housing and to said pivot pin whereby vertical swinging of said float arm occasions longitudinal movement of said stem.

9. A boiler feed regulator comprising, in combination, a float housing in communication with the boiler, a feed line for conveying feed water to the boiler, a valve in said line, a float in said housing, connections between said float and said valve whereby the valve is controlled by the position of the float, an intermediate housing secured at one end to the float housing and to the valve at the other end and enclosing said connections, and circuit controlling means mounted on the intermediate housing and adapted to be operated by said connections.

10. A float controlled boiler feed regulator comprising, in combination, a float housing having an inlet and an outlet, a closure for the housing, a float arm pivoted to said closure and having a portion extending into the float housing with a float thereon and a portion extending outside said closure, a second housing secured to the first housing and enclosing the outer end of the float arm, a liquid tight resilient bellows sealed to the arm and closure, a valve housing removably secured to the second housing, a self centering valve in the housing and having an operating stem projecting therethrough, packing for said stem, a spring pressed packing follower to maintain said packing tight, the outer end of said stem being threaded, a yoke secured thereto and provided with vertical slots, a link member pivoted to the float arm and having pivot means received within said slots, a horizontally swinging supporting link pivoted to the second housing and to said pivot means whereby vertical swinging of said float arm occasions longitudinal movement of said stem, said link member having a stop to limit the downward movement of the float and an abutment on the upper side thereof, a removable plate on the second housing, said second housing being open to atmosphere, and a circuit controlling switch mounted on said removable plate and having a switch operating rod adapted to be contacted by said abutment when the float is in its lower position.

11. A liquid level control mechanism comprising a float housing, a float therein, a float arm movably supporting the float and extending from the float housing, an intermediate housing secured to the float housing and extending laterally therefrom, valve means secured to said intermediate housing and including a longitudinally movable valve stem, connecting means between said stem and said float arm, and means carried by the intermediate housing for guiding said connecting means independently of said valve stem.

12. A liquid level control mechanism comprising a float housing, a float therein, a float arm movably supporting the float and extending from the float housing, an intermediate housing secured to the float housing and extending laterally therefrom and having an open end, a valve housing supported from said float housing at said end of the intermediate housing and having a valve including a longitudinally movable stem, said float and valve housings being normally subjected to different temperatures, and connecting means between the float arm and the longitudinally movable stem.

13. A liquid level control mechanism for boiler feeders and the like and comprising a float housing, a float therein, a float arm movably supporting the float and extending from the float housing, a valve housing mechanically connected with the float housing and spaced therefrom in thermally separated relation, temperature and pressure conditions within the valve housing being independent of the temperature and pressure conditions in said float housing, valve means movably mounted in said valve housing and including a movable stem, means acting as a toggle disposed in exposed position between said valve housing and said float housing for connecting said float arm with said stem to move the same, and means providing for the circulation of air between said float and valve housings in and around said exposed connecting means.

14. A liquid level control mechanism comprising a float chamber, a float therein, a float arm movably supporting the float and extending at one end from the float chamber, a valve housing including a valve adapted to control a fluid line, means maintaining said float chamber and valve housing in spaced apart relation, and means for directing a flow of cooling medium therebetween for modifying the transmission of heat between said chamber and housing, there being an operating connection between the float arm and the valve.

15. A liquid level control mechanism comprising a float chamber, a float therein, a float arm movably supporting the float and extending at one end from the float chamber, a valve housing including a valve adapted to control a fluid line, means maintaining said float chamber and valve housing in spaced apart relation, connections between said valve and float arm and extending across the space therebetween, and means providing for a flow of fluid between said chamber and housing in thermal relation with said connections for modifying the transmission of heat between said chamber and housing.

16. A boiler feed regulator comprising, in combination, a float housing, a float disposed therein having a float arm, connections between the upper and lower parts of said housing and the boiler, a feed line connected with a source of supply and said boiler and including a valve housing, a valve in said valve housing and having a stem extending through the valve housing, said valve seating against pressure of the feed line, a removable closure plate carried by the float housing, and said float arm being pivoted on said plate, there being operative connections between said float arm and said valve stem comprising a pair of toggle links, one of which is rigid with the float arm and has angular motion only, the other of which has angular motion and longitudinal motion to shift the valve stem.

17. A liquid level control mechanism comprising a float chamber, a float therein, a float arm movably supporting the float and extending at one end from the float chamber, an intermediate housing secured to the float chamber, a valve housing supported by the float chamber and including valve parts operable to control a fluid line, connections between the valve parts and the float arm, and means comprising spaced vents providing for the circulation of air in the intermediate housing and around said connections.

18. A liquid level control mechanism comprising a float chamber, a float therein, a float arm movably supporting the float and extending at one end from the float chamber, an intermediate housing secured to the float chamber, a valve housing supported by the float chamber and including valve parts operable to control a fluid line, connections between the valve parts and the float arm, and means including an opening in the lower portion of the intermediate housing and vents above said lower opening, thereby providing for the circulation of air in the intermediate housing and around said connections.

19. A liquid level control mechanism comprising a float chamber, a float therein, a float arm movably supporting the float and extending from the float chamber, the extended end of said float arm being disposed exterior of the float chamber, means carried by the float chamber and providing a pivotal support for the float arm exterior of the float chamber, separate means sealing the float arm to the chamber, a valve housing including a valve therein having a stem projecting therefrom, means mechanically connecting said float chamber and said valve housing in rigid but thermally separated relation, and exposed connections removed from both temperature and pressure conditions in either the float chamber or the valve housing and comprising a toggle of which said extended end of the float arm acts as one part thereof, the other part of the toggle being connected with said valve stem.

20. A liquid level control mechanism comprising a float chamber, a float therein, a float arm movably supporting the float and extending from the float chamber, means carried by the float chamber and providing a pivotal support for the float arm exterior of the float chamber, separate means sealing the float arm to the chamber, a valve housing including a valve therein having a stem projecting therefrom, means mechanically connecting said float chamber and said valve housing in rigid but thermally separated relation, exposed connections removed from both temperature and pressure conditions in either the float chamber or the valve housing and comprising a toggle operatively connecting the float arm with said valve stem, and means also out of contact with the interior of the valve housing for guiding said valve stem.

21. A liquid level control mechanism comprising a float chamber, a float therein, a float arm movably supporting the float and extending from the float chamber, means carried by the float chamber and providing a pivotal support for the float arm including a pair of laterally spaced ears disposed outside the float chamber, a mechanical bellows seal between the float arm and the float chamber, a valve housing including a valve therein having a stem projecting therefrom, a mechanical bellows seal between the valve housing and valve stem, means mechanically connecting said float chamber and said valve housing in rigid but thermally separated relation, and exposed connections removed from both temperature and pressure conditions in either the float chamber or the valve housing and operatively connecting the float arm with said valve stem.

22. A liquid level control mechanism comprising a float chamber, a float therein, a float arm movably supporting the float and extending from the float chamber, there being an opening in the float chamber accommodating the extended end of said float arm, a closure for said opening, a pair of spaced outwardly extending ears on said closure and providing a pivotal support for the extended end of said float arm exterior of the float chamber, separate means sealing the float arm to the chamber, a valve housing including a valve therein having a stem projecting therefrom, means mechanically connecting said float chamber and said valve housing in rigid but thermally separated relation, and exposed connections removed from both temperature and pressure conditions in either the float chamber or the valve housing and including power multiplying means operatively connecting the extended end of said float arm with said valve stem.

23. A liquid level control mechanism comprising a float housing having a lateral open end, a closure member connected with said housing over said opening, said float housing having connections at top and bottom adapted to be coupled to the steam and to the water spaces, respectively, of a boiler, a float arm movably supported relative to the float housing and having a portion extending into the float housing with a float thereon and a portion extending outside said closure, means carried by said closure member and providing a pivotal support for the float arm, said means including a pair of laterally spaced ears extending outwardly of said closure alongside said float arm, a mechanical bellows seal extending longitudinally of said float arm between said laterally spaced ears and connected with the float arm and said closure, a second housing secured to the first housing and enclosing the outer end of the float arm, and a device carried by said second housing and operated by vertical movement of the outer end of said float arm.

24. In a device of the class described, a feed valve having a valve stem and a valve housing, a float chamber having a movable float, said chamber having connections adapted to be coupled to the steam and water spaces, respectively, of a boiler, a lever for the float pivoted outside the chamber and extending loosely through a wall of the same, a laterally flexible seal for the lever disposed between said wall of the float chamber and the float lever to allow the lever to swing about its pivot, a longitudinally flexible seal between the valve stem and the valve housing of the feed valve to allow the valve stem to move axially, a rigid connection between the valve housing and the float housing, and pivotal connections comprising force multiplying means between the lever and the valve stem, said pivotal connections being all disposed out of contact with the water in either the float housing or the valve housing and serving to convert the angular motion of the lever into axial motion of the valve stem.

25. In combination, a valve housing, a movable valve having an operating stem extending outwardly through a wall of the valve housing, a float housing containing a float, said float housing having connections at its top and bottom adapted to be connected to the steam and water spaces, respectively, of a boiler, an arm for the float extending out through a wall of the float housing and having a pivotal support on and outside the float housing, pivotal force multiplying connections between the lever and the valve stem, said housings being rigidly connected together, a flexible metallic seal between the float housing and the lever permitting substantially free swinging of the lever about its pivotal support, and a flexible metallic seal between the valve housing and the valve stem permitting substantially free travel of the valve stem, whereby the pivotal linkage is disposed entirely out of contact with the contents of either the valve housing or the float housing.

26. A feed water regulator for boilers and the like and comprising, in combination, a float housing having connections at its top and bottom adapted to be coupled to the steam and water spaces, respectively, of a boiler and adapted to have its interior subjected to boiler temperatures and pressures, a float arm pivotally supported relative to the float housing and exteriorly thereof and having a portion extending into the float housing with a float thereon and a portion extending outside said housing, fluid tight sealing means comprising a laterally flexible bellows secured to said float arm and to said housing, a valve housing rigidly supported with respect to the float housing and provided with fluid flow control means in the form of a lift valve having a reciprocating valve stem projecting from the valve housing, said valve housing being subjected to feed water temperatures and pressures, sealing means comprising a longitudinally flexible bellows between said valve stem and the valve housing, and force multiplying means including pivotally connected parts extending between said float arm and said valve stem, all of said parts being disposed out of contact with the fluid in either the float housing or the valve housing.

27. In combination in a level controlled boiler feeder, a float chamber having connections adapted to be coupled to the steam space and the water space, respectively, of a boiler, a valve having a housing mechanically rigid with the float chamber but out of communication therewith, a float in the float chamber having a float lever pivoted intermediate its ends to swing angularly with rise and fall of the float, said lever comprising an inner arm connected to the float and an outer arm, said valve having a valve seat and lift valve plug adapted to be applied to said seat to close the valve, a stem for moving the valve plug to and from seat, and a link between the outer arm of the lever and the valve stem, said link and arm forming a toggle, said toggle being broken by fall of the float below a predetermined level to open the valve and being made by rise of the float to force the valve plug firmly against its seat.

28. In combination in a level controlled boiler feeder, a float chamber having connections adapted to be coupled to the steam space and the water space, respectively, of a boiler, a valve having a housing mechanically rigid with the float chamber but out of communication therewith, a float in the float chamber having a float lever pivoted intermediate its ends to swing angularly with rise and fall of the float, said lever comprising an inner arm connected to the float and an outer arm, said valve having a valve seat and valve plug adapted to be applied to said seat to close the valve, a stem for moving the valve plug to and from seat, a link between the outer arm of the lever and the valve stem, said link and arm forming a toggle, said toggle being broken by fall of the float below a predetermined level to open the valve and being made by rise of the float to force the valve firmly against its seat, and a guide for the outer end of the valve stem to take up the lateral reaction of the toggle.

29. In combination in a level controlled boiler feed device, a float chamber, a valve having a housing rigidly connected with said chamber, a float in the chamber, a float lever extending into and pivoted on the outside of said chamber, a flexible metallic bellows for sealing the lever and the chamber, said valve housing having an inlet connection adapted to be supplied with feed water under pressure and an outlet connection adapted for connection to the boiler, a valve seat of relatively small area and a metallic lift valve adapted to be applied to seat against the pressure of the incoming feed water, and a force multiplying connection between the float lever and the valve for holding the valve closed when the float rises above a predetermined level, said connection serving to block the valve against opening by the feed water pressure when said valve is closed.

30. A level controlled boiler feeder comprising a float chamber provided with steam and water connections adapted to be coupled to the steam and water spaces of a boiler, said chamber being subjected to the temperature of the steam in the boiler, which temperature is great enough to cause precipitation of solids such as lime from boiler feed water, said chamber having an opening in a side thereof, a float in the chamber, a lever having a fixed pivot on the chamber, a flexible metal bellows sealing the lever to the edges of the opening, said bellows being of a length to provide flexibility for swinging movement of the lever under the action of the float, a feed water valve having an inlet connection for cold water and an outlet connection leading to the interior of the boiler, said valve comprising a body, a valve seat, a lift valve member and a guide for guiding the valve member to seat, said valve member seating against pressure to close off the inflow of water, said valve seat providing a restricted port opening presenting a relatively small area to the inlet water pressure which tends to open the valve, said valve body being rigidly connected mechanically to the float chamber, but sufficiently isolated thermally to keep the heat transmitted from the float chamber to the valve from precipitating and depositing solids upon the valve member and valve seat during operation of the device, and a toggle connection between the float lever and the valve for applying the valve member to the seat against the pressure of incoming water with a high degree of pressure when the float rises above normal level, said toggle connection being substantially straight when the float is above said normal level.

31. A level controlled boiler feeder comprising a float chamber provided with steam and water connections adapted to be coupled to the steam and water spaces respectively of a boiler, said chamber being subjected to the temperature of the steam in the boiler, which temperature is great enough to cause precipitation of solids such as lime from boiler feed water, said chamber having an opening in one wall thereof, a float in the chamber, a lever pivoted upon the outside of the chamber and having an arm extending into the chamber through the opening and being coupled to the float, a flexible metal bellows connected with and sealed to the arm at one end and sealed to the walls of the chamber at the other to provide a relatively long laterally flexible seal, a feed water valve having a body provided with an inlet connection adapted to be coupled to a source of feed water under pressure, an outlet connection adapted to be coupled to the interior of the boiler, and a valve stem opening, said valve comprising a valve seat having a port of relatively small area, a valve plug and a stem for the valve plug, guiding means for guiding the valve plug to seat, said valve plug seating against the pressure of feed water entering through the inlet connection, said valve body being rigidly connected mechanically with the float chamber but sufficiently isolated from the heat from the float chamber substantially to avoid injurious precipitation and deposit of solids such as lime from the feed water upon the valve plug, stem and seat during operation of the device, a toggle mechanism connecting said float arm and said valve stem for applying said plug to its seat against the pressure of the incoming feed water with a high degree of pressure when the float is raised above normal level, and a relatively long, longitudinally flexible metal bellows sealed at one end to the valve stem and at the other end to the valve body about said valve stem opening.

32. In combination, a float housing having steam and water connections adapted to communicate with a boiler to be fed, and a lateral opening, a float in said housing adapted to be inserted into the housing through said opening, a cover for the opening, said cover having an opening, and pivot supporting means at the side of the opening, a float arm pivoted on said pivot supporting means and being coupled to said float, a flexible metallic bellows sealed to the float arm and to the margins of said opening in the cover, a feed water valve having a housing joined rigidly with said float housing, said valve housing having an inlet for feed water under pressure, and an outlet opening for outlet of feed water to the boiler and having an opening for a valve stem, a valve seat in said body between said inlet and said outlet, a conical valve plug adapted to seat against pressure of the incoming feed water, said seat providing a port of relatively small area, a valve stem connected to said valve plug, said stem projecting through said opening in the body, a longitudinally flexible metal bellows sealed to the stem and to the margin of the opening in the valve body, and a toggle mechanism between said float arm and said valve stem for operating said valve, said float in high level position moving the toggle mechanism to "toggle made" position whereby the valve plug is applied to seat against incoming feed water pressure with a high degree of pressure.

33. In combination, a float housing having steam and water connections adapted to communicate with a boiler to be fed, and a lateral opening, a float in said housing adapted to be inserted into the housing through said opening, a cover for the opening, said cover having an opening, and pivot supporting means at the side of the opening, a float arm pivoted on said pivot supporting means and being coupled to said float, a flexible metallic bellows sealed to the float arm and to the margins of said opening in the cover, a feed water valve having a housing joined rigidly with said float housing, said valve housing having an inlet for feed water under pressure, and an outlet opening for outlet of feed water to the boiler and having an opening for a valve stem, a valve seat in said body between said inlet and said outlet, a conical valve plug adapted to seat against pressure of the incoming feed water, said seat providing a port of relatively small area, a valve stem connected to said valve plug, said stem projecting through said opening in the body, a longitudinally flexible metal bellows sealed to the stem and to the margin of the opening in the valve body, a toggle mechanism between said float arm and said valve stem for operating said valve, said float in high level position moving the toggle mechanism to "toggle made" position whereby the valve plug is applied to seat against incoming feed water pressure with a high degree of pressure, and means for guiding the outer end of the valve stem to resist the lateral thrust of the toggle mechanism.

34. In a device of the class described, a float chamber, a float in the chamber, a lever having one arm connected to the float inside the chamber and having its other arm forming a toggle arm, said lever being pivoted outside the chamber upon a support rigid with the chamber, a seal between the lever and the chamber, a feed valve comprising a valve housing rigidly connected to the float chamber, a metal seat in the housing having a relatively small port therethrough, a metal lift valve controlling said port, a stem for the valve extending outside the valve housing, and a toggle link connecting the toggle arm of the lever and the valve stem to form a toggle between said pivot support and the valve, which toggle is straightened out to force the valve against the seat when the float rises above a predetermined level in the chamber.

35. In a device of the class described, a float chamber, a float in the chamber, a lever having one arm connected to the float inside the chamber and having its other arm forming a toggle arm, said lever being pivoted outside the chamber upon a support rigid with the chamber, a seal between the lever and the chamber, a feed valve comprising a valve housing rigidly connected to the float chamber, a metal seat in the housing having a relatively small port therethrough, a metal lift valve controlling said port, a stem for the valve extending outside the valve housing, a toggle link connecting the toggle arm of the lever and the valve stem to form a toggle between said pivot support and the valve, which toggle is straightened out to force the valve against the seat when the float rises above a predetermined level in the chamber, and guide means for guiding that end of the stem which is connected to the toggle link to take up the lateral thrust of the toggle.

36. In a boiler feeder, a float housing having a float therein, a connected float lever having a pivot outside the housing, a laterally flexible bellows sealing the lever, a valve housing rigid with the float housing, a lift valve in the valve housing, said valve being shiftable longitudinally to and from its seat, a longitudinally flexible bellows sealing the lift valve to the valve housing, a connection between the float lever pivot and the lift valve comprising a toggle joint having angular movement imparted thereto by said lever to shift said lever longitudinally, a low level cut-off switch and operating means operatively connected to said lever and having greater amplitude of motion than said toggle joint for operating said switch.

37. In a boiler feeder, a float housing having a float therein, a float lever having a pivot outside the housing and having connection with the float in the housing, a flexible bellows sealing the lever to the housing, a valve housing, a rigid connection from the float housing to the valve housing disposed substantially below the water line in the float housing to limit the heat transmitted from the first to the second housing, a lift valve in the valve housing, said valve being shiftable longitudinally to and from its seat, an operating member for said lift valve, flexible bellows sealing the lift valve operating member to the valve housing, a force multiplying connection between the float lever and the lift valve operating member, said connection limiting the transmission of heat from the float housing to the valve to avoid the deposit of lime on said valve.

38. In a boiler controller, a float housing having steam and water connections for application to a boiler, said housing having a lateral opening through which a float may be introduced, a closure member for said opening, said closure having an aperture, said member having pivot lugs extending outwardly therefrom at the sides of said aperture, a rigid float lever pivoted on said lugs, said lever being mounted for tilting motion, said lever having an arm extending inwardly from said pivot through said aperture and having a float on its inner end within the housing, a small diameter laterally flexible metallic bellows sealing said lever to the edges of said aperture whereby to keep the pivot out of contact with the contents of the housing, said lever having an arm extending outwardly from said pivot, a housing secured to said closure member and enclosing said pivotal mounting and said last named arm of the lever, and a control device mounted on said housing and being operated by said last named arm of the lever.

39. In a boiler controller, a float housing having steam and water connections for application to a boiler, said housing having a lateral opening through which a float may be introduced, a closure member for said opening, said closure having an aperture, said member having pivot lugs extending outwardly therefrom at the sides of said aperture, a rigid float lever pivoted on said lugs, said lever being mounted for tilting motion, said lever having an arm extending inwardly from said pivot through said aperture and having a float on its inner end within the housing, a small diameter laterally flexible metallic bellows sealing said lever to the edges of said aperture whereby to keep the pivot out of contact with the contents of the housing, said lever having an arm extending outwardly from said pivot, a housing secured to said closure member and enclosing said pivotal mounting and said last named arm of the lever, a control device mounted on said housing and being operated by said last named arm of the lever, and a boiler control device rigid with said closure member, said device having a movable operating element actuated by said last named lever arm.

OSCAR F. CARLSON.